United States Patent
Hussherr et al.

(10) Patent No.: US 10,420,275 B2
(45) Date of Patent: Sep. 24, 2019

(54) PLANTER EXHAUST AIR REMOVING APPARATUS AND METHOD OF USE THEREOF

(71) Applicant: Syngenta Participations, Basel (CH)

(72) Inventors: Benoit Hussherr, Basel (CH); Franz Brandl, Basel (CH)

(73) Assignee: Syngenta Participations AG, Basel (CH)

( * ) Notice: Subject to any disclaimer, the term of this patent is extended or adjusted under 35 U.S.C. 154(b) by 204 days.

(21) Appl. No.: 15/027,326

(22) PCT Filed: Oct. 7, 2014

(86) PCT No.: PCT/EP2014/071475
§ 371 (c)(1),
(2) Date: Apr. 5, 2016

(87) PCT Pub. No.: WO2015/052205
PCT Pub. Date: Apr. 16, 2015

(65) Prior Publication Data
US 2016/0242352 A1    Aug. 25, 2016

(30) Foreign Application Priority Data

Oct. 8, 2013 (EP) .................................... 13187701
Feb. 19, 2014 (EP) .................................... 14155764

(51) Int. Cl.
*B01D 45/00* (2006.01)
*A01C 7/08* (2006.01)
(Continued)

(52) U.S. Cl.
CPC .............. *A01C 7/082* (2013.01); *A01C 7/042* (2013.01); *A01C 7/081* (2013.01); *B01D 45/16* (2013.01);
(Continued)

(58) Field of Classification Search
CPC ......... A01C 7/082; A01C 7/042; A01C 7/081; B01D 50/002; B01D 46/521; B01D 45/16; B01D 45/12; A47L 9/1641; A47L 9/1666
See application file for complete search history.

(56) References Cited

U.S. PATENT DOCUMENTS 3,210,061 A * 10/1965 Nogiwa ................ F27B 15/003
266/157
3,716,947 A *  2/1973 Carpenter .............. B02C 13/09
241/275
(Continued)

FOREIGN PATENT DOCUMENTS

JP      2010023436 A  *  2/2010
WO     2012029003 A1     3/2012
(Continued)

OTHER PUBLICATIONS

International Search Report and Written Opinion for International Application No. PCT/EP2014/071475 dated Jan. 12, 2015.

*Primary Examiner* — Dung H Bui
(74) *Attorney, Agent, or Firm* — Baker & Hostetler, LLP; Toni-Junell Herbert (57) ABSTRACT

An exhaust air filtration apparatus comprises a vacuum planter (10) having a cyclonic separator (30) and a filter unit (40). A method of removing particulate matter can utilize the apparatus.

13 Claims, 7 Drawing Sheets

(51) Int. Cl.
*A01C 7/04* (2006.01)
*B01D 45/16* (2006.01)
*B01D 46/52* (2006.01)
*B01D 50/00* (2006.01)
*A01C 7/16* (2006.01)
*A01C 7/20* (2006.01)

(52) U.S. Cl.
CPC ......... *B01D 46/521* (2013.01); *B01D 50/002* (2013.01); *A01C 7/04* (2013.01); *A01C 7/084* (2013.01); *A01C 7/166* (2013.01); *A01C 7/206* (2013.01)

(56) References Cited

U.S. PATENT DOCUMENTS

| | | | | |
|---|---|---|---|---|
| 4,296,695 A | * | 10/1981 | Quanbeck | A01C 15/04 111/136 |
| 4,432,675 A | * | 2/1984 | Machnee | A01C 7/081 111/174 |
| 4,758,119 A | * | 7/1988 | Frase | A01C 7/042 111/147 |
| 4,793,743 A | * | 12/1988 | Grodecki | A01C 7/081 406/123 |
| 4,929,178 A | * | 5/1990 | Maury | C04B 7/434 432/106 |
| 5,163,786 A | | 11/1992 | Christianson | |
| 6,244,201 B1 | * | 6/2001 | Mauch | A01C 9/02 111/172 |
| 6,273,153 B1 | * | 8/2001 | Reinsch | A01C 7/042 141/346 |
| 6,833,016 B2 | * | 12/2004 | Witter | B01D 50/002 451/88 |
| 8,690,979 B2 | * | 4/2014 | Nagasawa | B01D 45/16 55/326 |
| 9,205,999 B2 | * | 12/2015 | Woods | B65G 53/64 |
| 2002/0144637 A1 | * | 10/2002 | Wendling | A01C 7/042 111/163 |
| 2006/0107629 A1 | * | 5/2006 | Oh | A47L 9/1625 55/345 |
| 2007/0289266 A1 | * | 12/2007 | Oh | A47L 9/1608 55/337 |
| 2008/0010958 A1 | * | 1/2008 | Fester | A47L 9/122 55/472 |
| 2014/0216333 A1 | * | 8/2014 | Hoversten | B05B 16/405 118/308 |
| 2014/0238284 A1 | * | 8/2014 | Kapphahn | A01C 15/04 111/174 |
| 2015/0282422 A1 | * | 10/2015 | Hahn | A01C 7/20 111/185 |

FOREIGN PATENT DOCUMENTS

WO 2013/130003 A1 9/2013
WO 2013/139643 A1 9/2013

* cited by examiner

PLANTER EXHAUST AIR REMOVING APPARATUS AND METHOD OF USE THEREOF

CROSS REFERENCE TO RELATED APPLICATIONS

This application is a 371 of International Application No. PCT/EP2014/071475, filed Oct. 7, 2014 which claims priority to European Application No. 13187701.1, filed Oct. 8, 2013 and European Application No. 14155764.5 filed Feb. 19, 2014, the contents of which are incorporated herein by their entirety.

FIELD OF THE INVENTION

The present invention relates to an apparatus for the removal of particulate matter from air exhausted from vacuum seed drilling equipment, and to methods of using the apparatus.

BACKGROUND OF THE INVENTION

Technical progress in agriculture continues to bring advancement in planters and the seeds they sow. Towed behind a tractor, planters are machines for drilling crops such as maize (corn), soybean, sugarbeet, cotton, oil seed rape (canola) and sunflower. Planters open a sowing furrow of desired depth, drill (sow) seed into the furrow, then close the furrow covering the seed with soil. Many planters use vacuum systems whereby a fan or turbine generates a vacuum which pulls a seed toward a planting disk and holds it against a suitably-sized hole in the disk. When the disk rotates to the desired position the vacuum is released, allowing metered passage of seeds which is a component of accurate drilling. Such technology is sometimes referred to as pneumatic planting and is well known in the art, see U.S. Pat. No. 5,170,909.

Seeds represent a considerable investment to a grower, to protect them until sowing and offer the best possible conditions for early plant development they can be provided with a seed dressing or treatment. Seed treatments often include agrochemicals such as insecticides and fungicides as well as adhering and/or coating agents intended to hold the seed treatment components on the seed. For various reasons the seed treatment can fail to form a coherent layer which remains intact through processing, storage, transport and drilling.

One consequence of the use of a vacuum during the drilling process is that there is exhaust air to release into the surroundings. Untreated seeds which have not been suitably cleaned generate dust and debris which is carried in the exhaust air. Likewise waste is present in the exhaust air from treated seeds, whether due to a less than optimal seed treatment or simply because of abrasion during transport, storage and loading of seeds into the hopper. While the dust and debris from untreated seeds is unsightly but typically not dangerous, fragments of coatings or dust from treated seed can potentially be harmful to humans, animals and insects in the immediate vicinity of the drilling, as well as to the local environment in general.

Early planters exhausted outlet air into the atmosphere above or beside the planter, but this was not ideal. An improvement was to deflect outlet air toward the soil surface. Larger or heavier debris might remain in place on the soil, but even when the deflector was positioned behind the furrow opener dust, especially fine particle dust, was still measurable around the planter.

It has been recommended to direct the outlet air into a tube or similar device which is positioned below the soil surface, channeling outlet air into the field. The tube creates an indentation which is like an additional furrow. A device provided under the trade name SWEEPAIR separates dust from air and diverts the dust into the ground.

It has also been proposed to recirculate the exhaust air into the vacuum drilling system, releasing toward the ground only that which is necessary to keep the system temperature suitable, see U.S. Pat. No. 8,443,742. An improvement on this technology described in WO 2012/029003 is to filter the small portion of air which is released. A standard air filter can be provided to a pressure compensation chamber for the recirculating air, to prevent dispersion of dust contained in the chamber when air is released therefrom.

Despite advances in the art, there remains a need for alternative options for drilling seeds in a safe and environmentally-friendly manner, which address the problems associated with known methods.

SUMMARY OF THE INVENTION

The solution according to the invention lies with provision of two components in fluid communication with the outlet air of a vacuum planting device. Larger and heavier particles fall out of the air flow in a cyclonic separator, the air exiting which is passed through a filter unit to trap smaller particles before air is released to the external environment. The invention includes both an apparatus or system, and methods of use thereof.

In a first aspect, the present invention provides an agricultural machine which comprises a vacuum planter having a planter air outlet, a cyclonic separator having a first end and a second end, the first end comprising a cyclonic separator air inlet and a cyclonic separator air outlet, and the second end comprising a particle area, a filter unit, a first air conduit disposed between the planter air outlet and the cyclonic separator air inlet, and a second air conduit disposed between the cyclonic separator air outlet and the filter unit.

The particle area can define an opening in the second end of the cyclonic separator and/or comprise a removable or openable receptacle. Alternatively, the particle area may comprise a particle passageway between an opening in the second end of the cyclonic separator and an agricultural field, when the agricultural machine is in use.

The cyclonic separator can comprise a single cyclonic separation unit, or a plurality of cyclonic separation units which can optionally be configured in parallel or series.

The filter unit can comprise a housing and filter disposed in the housing. The filter can be cleanable or disposable.

In a second aspect, the present invention provides a method of removing particulate matter from exhaust air exiting an agricultural vacuum planter which comprises directing the exhaust air exiting an agricultural vacuum planter to a cyclonic separator and directing air exhausted from the cyclonic separator to a filter unit.

DETAILED DESCRIPTION OF THE INVENTION

The invention relates to crops which can be planted using a vacuum planting device, examples include cereals for example, maize and sorghum; fibre plants for example cotton; field crops for example sugar beet, red beet, fodder beet, mustard, oilseed rape, poppy, sunflower, and tobacco; legumes for example beans, lentils, peas and soybeans; nuts for example ground nut and peanut.

The invention is particularly preferred for use in planting maize, sunflower, and soybeans.

As stated above, the particle removing apparatus of the present invention provides two components in fluid communication with the outlet air of a vacuum planting device. The outlet air is first directed to a cyclonic separator. A flexible hose or tube may be suitable for this connection.

Cyclonic separators are known, see U.S. Pat. No. 2,377,524. Air is introduced tangentially into a first end of the cyclonic separator. Due to a generally conical configuration of the inside of the cyclonic separator, air entering tangentially flows in a helical motion towards the second end of the cyclone. Reaching the second end the air flow turns inward and passes more or less straight through the central portion of the cyclonic separator back toward the first end. During the helical motion the increasingly narrow inside of the cyclonic separator makes it increasingly difficult for larger or heavier particles to remain suspended in the airflow. Instead they fall out of the air flow and collect in the narrow second end.

The narrow second end can be an opening with a closeable, detachable, releasable or otherwise accessible component facilitating access to the collected particles for recovery/disposal. For example, a thread can be machined into the second end to engage a cap or collector which can be screwed on and off. Any suitable means can be employed, however it will be appreciated that the particle removing apparatus of the invention is provided on a planter, which will be moving through agricultural fields and thus a minimum level of robustness will be required to ensure successful operation in practice.

Because it is moving through fields where the particles captured were intended to be inserted, an alternative is to deposit the particles directly into the field while in use. A tube or pipe could be provided for this purpose, to passively or actively transfer particles into the upper surface of the soil in the field.

A disposable collector may be used at the second end to minimize exposure to the collected matter, for example a plastic or other impermeable bag which is secured to the second end. An indicator may be provided to show how much particulate matter has accumulated in the cyclonic separator, or to alert a user that there is a need to empty particles from the cyclonic separator.

Although the conventional cyclonic separator is oriented vertically, with input and output air at the top end and particle collection at the bottom end, horizontal cyclonic separators are also known and fall within the scope of the invention.

The cyclonic separator has been described as a single unit. For durability, ease of construction and cost efficiency this may be preferred for some agricultural applications. However, multiple-cyclone cyclonic separators are known and fall within the scope of the invention. These comprise a plurality of individual cyclones operating in parallel with a common air input and output. In the practice of the present invention a single cyclonic separator may be easier to accommodate on a planter, since the higher pressure drop of a multiple-cyclone could require a physically larger unit to efficiently handle the same air volume and flow rate.

It is contemplated that a plurality of individual or multiple cyclonic separators may be provided in series. For example a first cyclonic separator could be configured to remove the largest particles such as broken seeds or pellets, a second cyclonic separator could be configured to remove medium particles and a third cyclonic separator configured to remove small particles and large pieces of dust. See e.g. EP 0 042 723. It will be appreciated that relative terms such as large, medium and small will vary in actual measurement depending on the particular application. For example, a large particle in the context of drilling maize will be of greater size than a large particle in the context of drilling cotton.

Although a skilled person will appreciate they do not rely on cyclonic action per se and therefore are not typically associated with the class of cyclonic separators, it is contemplated to use a baffle chamber design as the cyclonic separator in the particle removing apparatus. A baffle chamber does not direct air in a circular flow but instead relies on a baffle plate to disrupt air flow. Larger and heavier particles fall out of the disrupted air flow and settle to the bottom of the chamber. A baffle chamber might remove fewer small to medium sized particles as compared to a similarly-sized true cyclonic separator. This could result in greater demands on the filter unit portion of the particle removing apparatus. However, where a baffle chamber may be more readily available or cost effective the same is still intended to fall within the scope of the claimed invention.

An advantage of cyclonic separators is that they operative passively; they do not require energy input from the tractor or other device.

When determining the most suitable size, shape and configuration of a cyclonic separator for use with the present invention, a skilled person will consider factors such as the air volume and velocity.

The cyclonic separator is preferably mounted directly on the frame of the planter at or near the air exhaust from the turbine. This has been found to be a suitable location. The planter is relatively stable in this region. The proximity to the air exhaust allows for a shorter connection into the cyclonic separator which reduces materials needed and minimizes settling of particles along the route from the turbine to the cyclonic separator.

Output air from the cyclonic separator is directed to a filter unit. This may comprise a fixed or flexible connection. In one embodiment the cyclonic separator and filter unit are fused in a single apparatus with an even upper surface, allowing a fixed connection along the top to direct air coming out from the middle of the cyclonic separator to the side before turning the airflow downward into the filter unit. By providing these components as a single unit, they may be better suited to stably perform under field conditions which include vibrations, winds, and the like.

Because an advantage of the present invention lies in its ability to be configured without power or energy inputs, passive filters are preferred. However, all suitable equipment and devices for removing fine particles from air flow are encompassed in the invention.

Paper, fiberglass, fabric such as cotton, and foam such as oil-wetted foam are all examples of materials suitable for a filter element. Electrostatic or high-efficiency particulate air filters (HEPA filters) are widely available, however they may be less preferred since they may not be especially efficient at handling the volume of particles and particle sizes expected under some drilling conditions. Preferred materials and sizes will accommodate the expected capacity with minimal restriction to airflow.

In a preferred embodiment the filter unit comprises an outer housing to shield the actual filtering material from wind, rain and the like, with an inner portion configured to receive a disposable air filter. For example, a fine dust pocket filter can be placed in the housing and used until the filter contains sufficient dust to start decreasing airflow, at which time it can be removed and disposed of appropriately and a fresh filter inserted in the housing.

Particularly when drilling treated seed, disposable filters may be preferred. They will be expected to capture some amount of agrochemical waste which may need to be disposed of in a specific manner. A reusable filter which must be washed or cleaned may result in water or other cleaning fluid contaminated with agrochemical waste, increasing the amount of material requiring disposal.

When determining the most suitable size, shape and configuration of a filter unit for use with the present invention, a skilled person will consider a number of factors. Principally, the factor to evaluate is the volume and velocity of air that will be accommodated by the particle removing apparatus. One may choose to estimate the approximate maximum expected airflow and select a filter unit which is designed to handle at least this amount. This should reduce the chances that the filter unit causes a backup in air pressure toward the cyclonic separator.

The filter unit is preferably part of a continuous device along with the cyclonic separator. Where they are provided as discrete units the filter unit will preferably be in close proximity to the cyclonic separator, for example mounted on the planter/cyclonic separator, to minimize the distance air must pass to reach the filter unit. This should prevent dust and small debris from settling in the connection between the cyclonic separator and the filter unit. Where airflow passes downward through the filter and out into the environment a filter unit or filter housing could be completely open at the base, although it may be preferable to have a physical barrier such as mesh or screen, for example to block stones deflected up by movement of the planter from hitting the filter material and causing damage.

A configuration aspect of the planter which may help achieve maximum performance of the particle removing apparatus is the position of the entrance for input air. Where this is close to the soil level, air entering the system will be more likely contaminated with dust. This is particularly true when drilling under dry soil conditions. Although the input air to the system is generally dictated by the design and manufacture of the planter, where possible to influence or modify this feature it can be preferred to adjust the air intake to be as far above the soil/planting surface as is reasonably possible. Such a configuration can prevent unnecessary additional emptying of the cyclonic separator and filter unit of the invention due to aspired dust. A prefilter may also be provided to remove particles from the air before it reaches the vacuum system, for example as a cover over the air intake opening.

Although the connections through which air passes from the vacuum planter to the cyclonic separator and therefrom to the filter are described as fixed, it is contemplated that these connections could be releasable or otherwise capable of being disengaged. Once a vacuum planter has been used to drill treated seeds it would be recommended to always engage the cyclonic separator and filter in future use. Even when drilling untreated seeds, the dust and debris exiting the vacuum planter could contain residual materials from previous planter uses. However for e.g. maintenance and cleaning it may be desired to access individual components of the particle cleaning apparatus.

Figure 1:
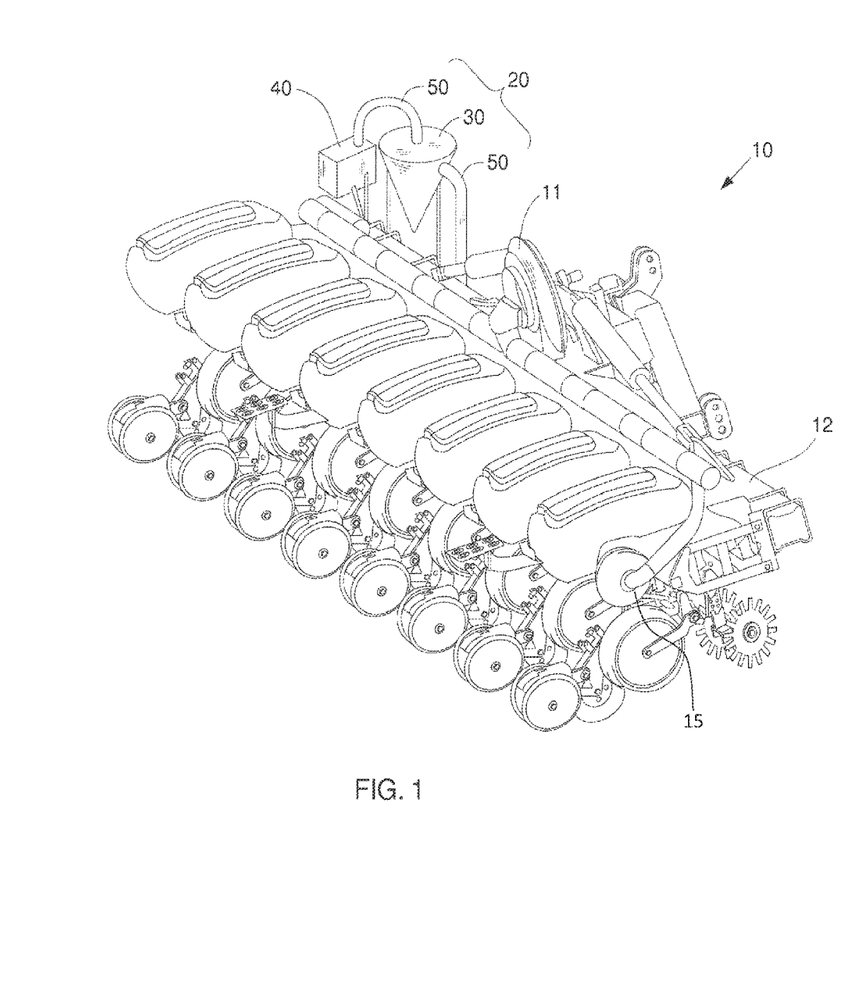
FIG. 1 shows a rear perspective view of a planter having a cyclonic separator and filter unit in accordance with the invention.

The invention will now be described with reference to the appended figures, in which FIG. 1 shows a planter 10 having a particle removing apparatus 20 according to the invention. The planter 10 may use vacuum systems whereby a fan or turbine 11 generates a vacuum which pulls a seed toward a planting disk 15 and holds it against a suitably-sized hole in the disk 15. Particle removing apparatus 20 comprises a cyclonic separator 30 and a filter unit 40. Conduits 50 provide fluid communication between air exiting a turbine 11 of planter 10, cyclonic separator 30 and filter unit 40. Cyclonic separator 30 and filter unit 40 are depicted as individually secured to or mounted upon a frame 12 of planter 10 and at some distance to turbine 11. It will be appreciated that this is merely for ease of illustration; it is contemplated that the cyclonic separator and the filter unit could be provided contiguous as a single article adjacent to the turbine.

When planter 10 provided with particle removing apparatus 20 is used to drill seeds in a field (not shown), particle removing apparatus 20 will remove and retain loose particles and dust present in the exhaust air exiting turbine 11. At the suitable time and place materials trapped in the particle removing apparatus 20 can be removed or otherwise disposed of. This may offer an improvement over existing technologies which deposit particles in, on, or around the field.

However, it is also contemplated that a particle removing apparatus of the invention could be configured to deposit particles into the field, A conventional device which could achieve this would be a tube or pipe with an open end positioned to connect the cyclonic separator and the field, reaching into the top of the soil layer. This would create a deposit of material into a kind of furrow, which close back onto itself and contain the particles in the field. Under various field and weather conditions different conduits could be used for example adding a spreading or flattening type of feature to smooth over the soil surface. Additionally, a means to control opening and closing of such a passageway could allow a user to selectively deposit debris and particles from the cyclonic separator. For example, while turning at the edge of a field or transporting drilling equipment to/from a storage facility the connection could be closed.

Figure 2:
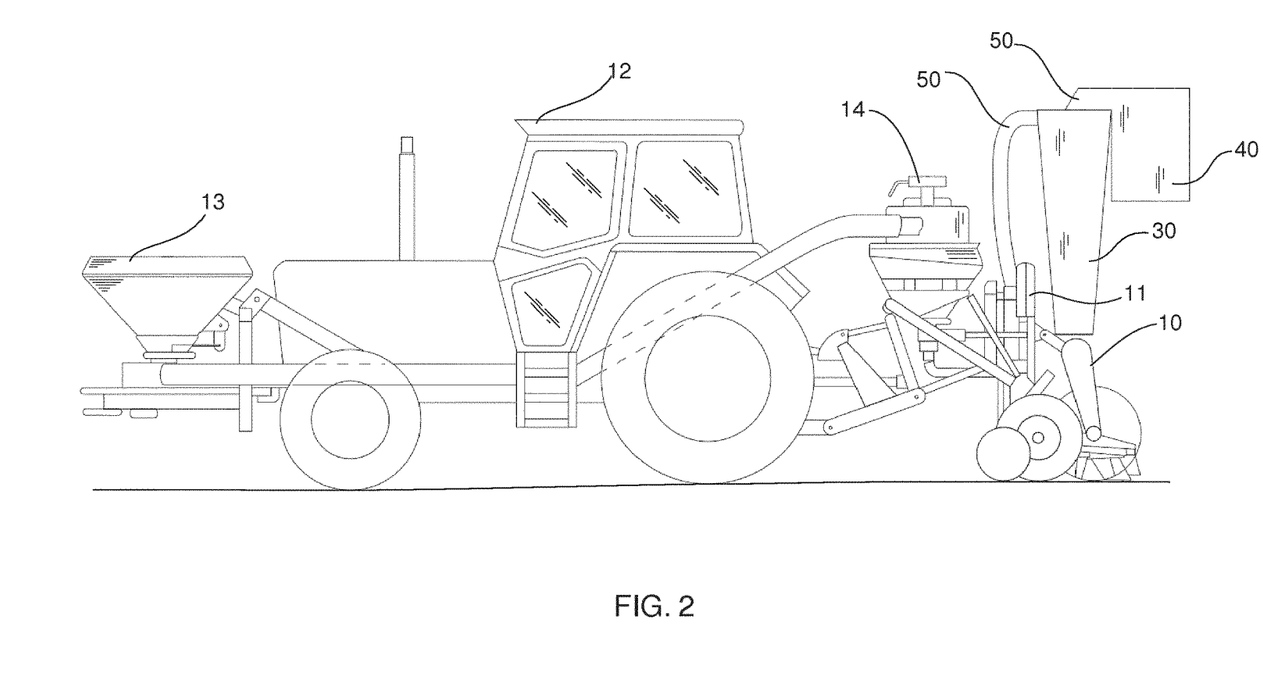
FIG. 2 shows a side plan view of a tractor and planter, the planter having a cyclonic separator and filter unit in accordance with the invention.

FIG. 2 depicts a planter 10 having a turbine 11 and being drawn by a tractor 12. Exhaust air from turbine 11 is guided by a first conduit 50 and directed tangentially into a cyclonic separator 30. Air flowing out of cyclonic separator 30 is guided by a second conduit 50 into a filter unit 40. Tractor 12 is configured in a manner which growers occasionally prefer, having a fertilizer storage device 13 and a fertilizer distribution device 14. This is just one example of how alterations and additions can be made to components used in conjunction with vacuum seed drilling equipment incorporating the particle filtration apparatus of the invention.

Figure 3:
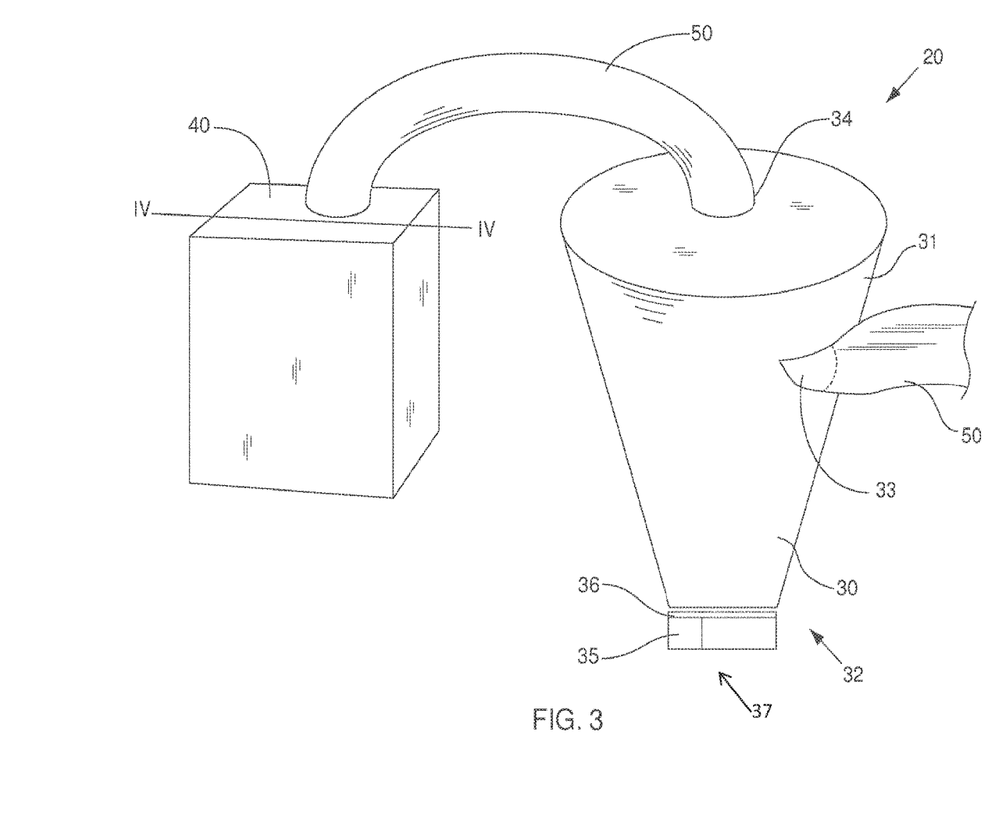
FIG. 3 shows a perspective view of a cyclonic separator and filter unit in accordance with the invention.

FIG. 3 schematically represents a particle filtration apparatus 20 having a cyclonic separator 30. Cyclonic separator 30 has a first end 31 and a second end 32. First end 31 is configured to accommodate a cyclonic separator air inlet 33 and a cyclonic separator air outlet 34. Second end 32 defines an area for particles to collect or exit, through particle passageway 37, cyclonic separator 30. In the embodiment shown, a detachable receptacle 35 can be provided with threads 36 which engage second end 32 and allow for ease of removal and replacement of detachable receptacle 35. In use, particles (not shown) collect in detachable receptacle 35 and at the suitable time are removed and properly disposed of. Depending on the particles, disposal could be e.g. to bury, incinerate, or deliver the particles to a waste collection point.

A filter unit 40 receives output air from cyclonic separator 30 and is configured to apply a filtration step to the air prior to releasing it to the surrounding environment. Two variations on a cross sectional view taken along line IV-IV are depicted in FIGS. 4A and 4B.

Figure 4A:
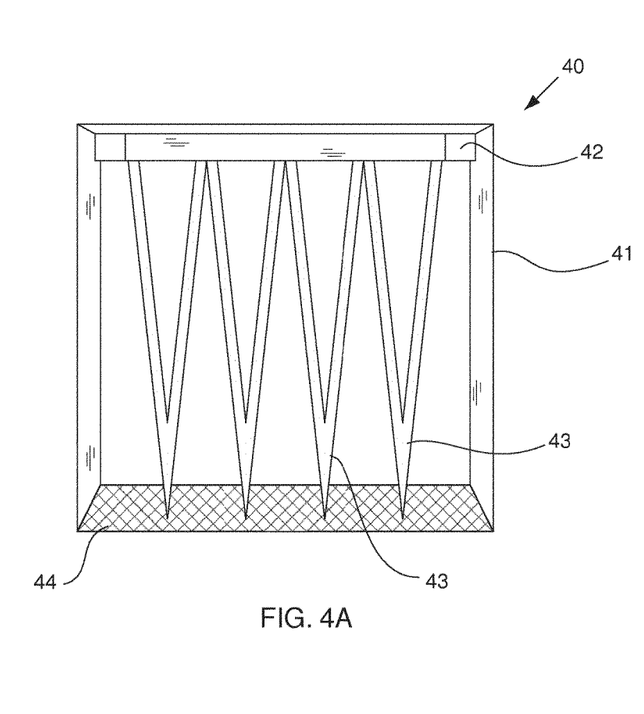
FIGS. 4A and 4B show side cross sectional views of a filter unit taken along the line IV-IV in FIG. 3.

FIG. 4A is a cross sectional view of a filter unit 40 which comprises a housing 41 and disposed therein a pocket filter having a frame 42 of e.g. metal or plastic supporting a plurality of pleats 43 in a filtration material formed from e.g. glass or synthetic fibers. Air (not shown) which enters housing 41 would do so at the end or side where frame 42 is positioned. After flowing through pleats 43 air would pass out an opposite end of housing 41, in this embodiment by passing over a mesh 44. Mesh 44 protects pleats 43 from outward physical disturbance, for example, from stones or clumps of earth bouncing or projecting in the space around the planter (not shown) while in motion. Mesh 44 could also deter or prevent animals or other creatures from entering housing 41.

Figure 4B:
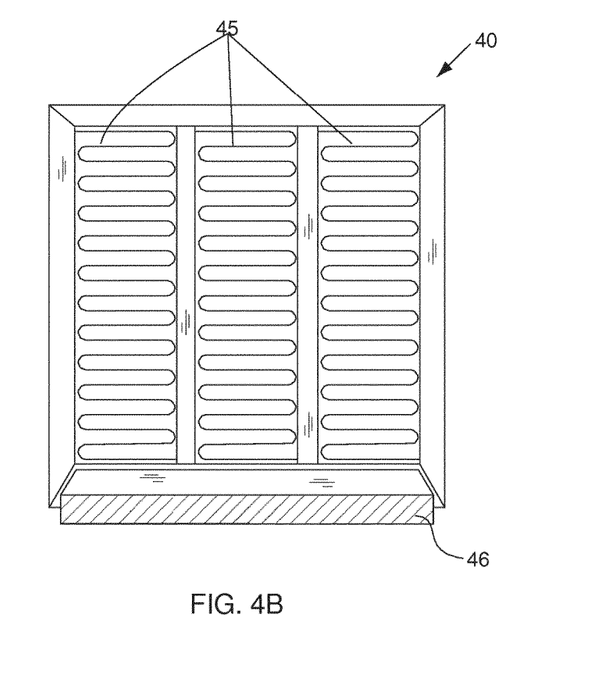

FIG. 4B is a cross sectional view of an alternative embodiment of a filter unit 40 provided with a plurality of pleated paper filters 45. Again housing 40 is provided with an open region for air output, in this embodiment fitted with an air filter 46 for example of the type formed from spun glass filament.

An embodiment such as 4B which relies on two different filtration materials could position them such that the first material reached by the air traps particles down to a first size, and the second and further materials trap ever smaller particles. Such a configuration should capture particles at or above the desired size while also permitting air to pass as efficiently and with as little impedance as possible.

Although the filtration unit of the invention has been depicts as a rectangular or square component, it will be appreciated that any suitable size and shape could be employed with the present invention. Preference may be given to shapes which are easy and economical to manufacture, store, transport, and use.

Figure 5:
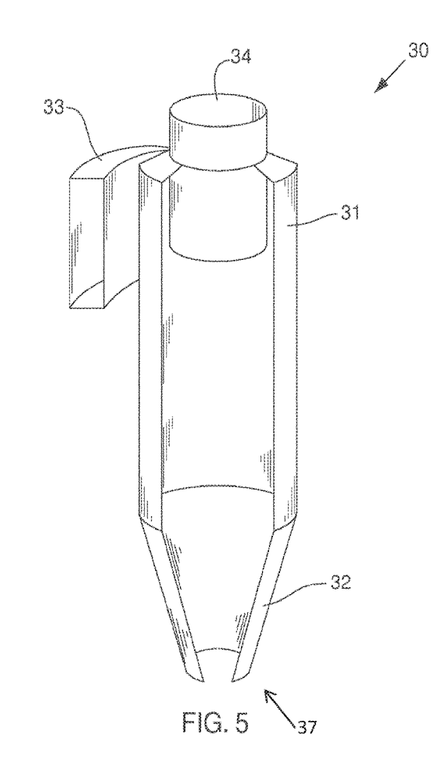
FIG. 5 shows a partial cross sectional perspective view of a cyclonic separator in accordance with the invention.

FIG. 5 depicts a sectional view of a cyclonic separator 30 which could be employed in the practice of the present invention. At a first end 31 is provided a cyclonic separator air inlet 33 directing air into cyclonic separator 30 at the appropriate place and angle to initiate helical motion of the air toward a second end 32. Second end 32 defines an area for particles to collect or exit, through particle passageway 37, cyclonic separator 30. In practice a closure or covering is often located at or around second end 32 to contain particles falling out of the air flow. Such a feature also contributes to the overall physical properties of the design, causing air flow to turn inward at second end 32 and return to first end 31, exiting the device through a cyclonic separator air outlet 34.

Figure 6:
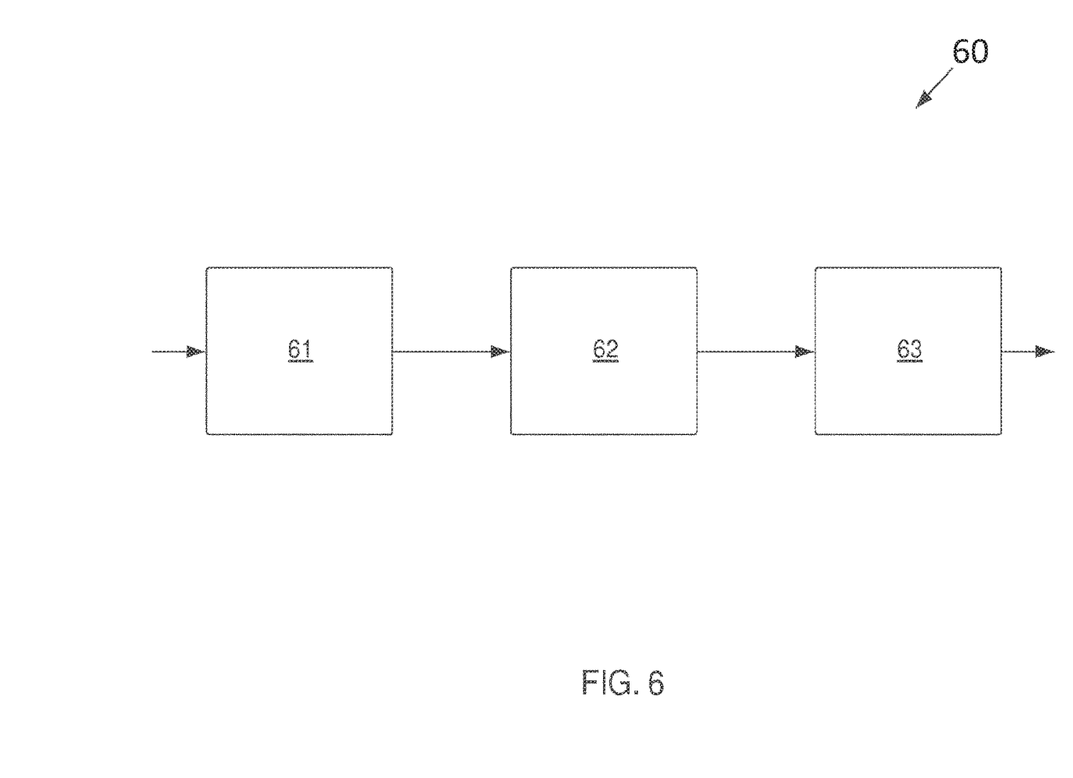
FIG. 6 schematically represents a first air flow process according to the invention.

FIG. 6 is a schematic using arrows to depict an air flow pattern 60 using a particle separation apparatus of the invention. A vacuum planting device 61 is provided which uses ambient air to drive a vacuum resulting in more accurate and efficient seed drilling. Exhaust air from vacuum planting device 61 enters cyclonic separator 62 where a proportion of particles present in the air flow will collect. Exhaust air from cyclonic separator 62 will contain fewer particles than the air did when entering cyclonic separator 62, and enters a filter unit 63 where remaining particles are removed from the air flow before it is released back into the ambient environment. The particle size of the materials employed in filter unit 63 ultimately determines which particles are released from the system.

Figure 7:
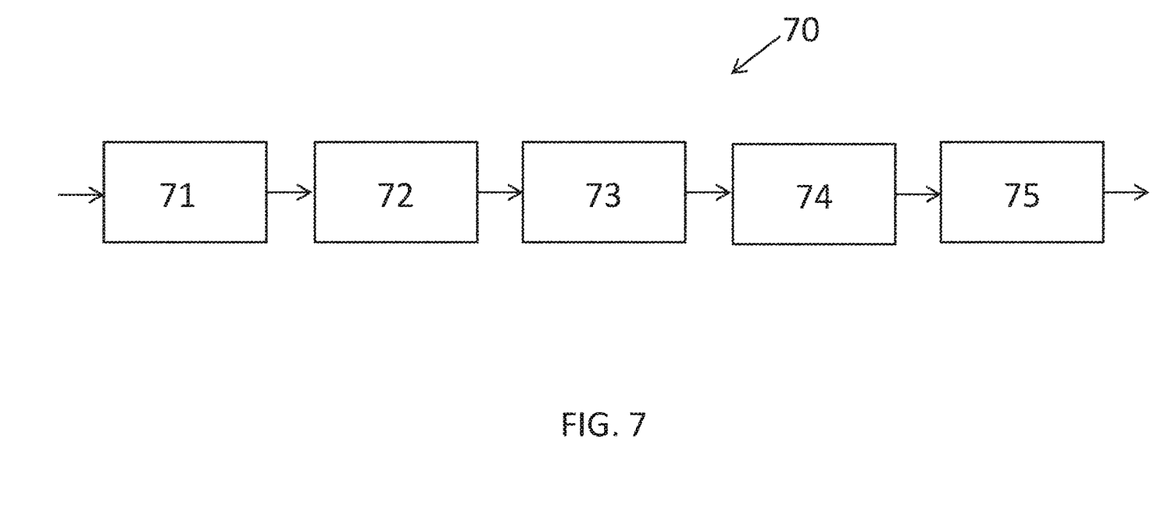
FIG. 7 schematically represents a second air flow process.

FIG. 7 is a schematic using arrows to depict an air flow pattern 70. A vacuum device 72 is provided which uses ambient air to drive a vacuum resulting in more accurate and efficient seed drilling. A prefilter 71 may be provided to remove particles from the air before it reaches the vacuum system. Exhaust air from vacuum device 72 enters a plurality of cyclonic separators connected in series, in some embodiments this includes a first cyclonic separator 73 and a second cyclonic separator 74. Either or both the first cyclonic separator 73 and second cyclonic separator 74 may be horizontally oriented or have a baffle chamber design, as discussed above. Exhaust air from the second cyclonic separator 74 enters a filter unit 75 where remaining particles are removed from the air flow before it is released back into the ambient environment.

By providing both a cyclonic separator and a filter unit, the particle removing apparatus of the invention offers an efficient yet thorough way to help ensure air expelled from a vacuum planter is at least as free from particles as it was when it entered the vacuum planting system.

The following examples are provided by way of exemplification and not limitation.

Example 1: Evaluation of a First Embodiment

An experiment was conducted to evaluate the performance of an embodiment of the particle removing apparatus of the invention. 140 kg of maize seeds were treated using a WN 5 rotostat treater (Willy Niklas GmbH Apparatebau, Germany) with a conventional seed treatment product (CRUISER insecticide, Syngenta Crop Protection AG, Switzerland; MAXIM XL fungicide, Syngenta Crop Protection AG; SEPIRET 9290 pigment, Becker Underwood, France) according to standard rates and procedures. After drying the seeds were placed in a vacuum planter (MONOSEM 8 rows, MONOSEM, France) and drilled in a field at standard speed using standard techniques.

All of the exhaust air from the vacuum planter turbine was channeled to a cyclonic separator via a flexible hose. The cyclonic separator was provided in a cylindrical outer housing and having a detachable base. The cyclonic separator was fixed to the planter near the turbine and between seed hoppers.

All of the exhaust air from the cyclonic separator was channeled to a filter unit via a fixed connection. The filter unit included a metal housing fitted with a fine dust pocket filter (0.5 micron particle size, 820 $m^3$/hour maximum air flow, 2.1 $m^2$ active filter surface area, UNIFIL AG, Switzerland). The filter unit was fixed to the cyclonic separator.

In a first trial, 50 Ha were planted under wet soil conditions. In a second trial, 35 Ha were planted under dry soil conditions. After planting the particles collected in the cyclonic separator and filter unit were weighed for each trial. Results are shown in Table 1.

TABLE 1

| | Collected Particles (g) | | Collected Particles (g/Ha) | |
|---|---|---|---|---|
| Trial | Cyclonic Separator | Filter Unit | Cyclonic Separator | Filter Unit |
| 1 | 285 | 400 | 5.7 | 8 |
| 2 | 450 | 1530 | 12.9 | 43.7 |

Because of the filter chosen for the experiment, air expelled from the particle separating apparatus should contain no particles larger than 0.5 microns. It is believed that air expelled from the system was relatively equivalent to the air drawn into the vacuum planting system.

It is evident that the first trial, sown under wet conditions, caused far less dust and particulate matter to be created and captured than in the second trial, when conditions were dry. Of the particles collected in the first trial the cyclonic separator accounted for 42% of the capture and the remaining 58% was from the filter unit. In such a configuration one would expect that either the filter unit should be considerably larger or able to accommodate greater loads than the cyclonic separator, or that the portion of the filter unit capturing the particles might have to be emptied or cleaned more frequently than the cyclonic separator.

In the second trial only 23% of the particles were in the cyclonic separator. The 77% in the filter unit were largely comprised of soil dust.

The results of Trials 1 and 2 show that substantial amounts of particles and dust are recovered when soil conditions are dry. To accommodate this possibility while providing the most efficient system possible, the cyclonic separator should be designed to remove or collect a larger fraction of the particles than the filter unit.

Example 2: Evaluation of a Second Embodiment

Maize seeds were provided in a manner similar to Example 1. The cyclonic separator was provided with a length along the central axis being multiples of the width of the cyclonic separator. This was intended to result in a greater proportion of particles captured in the cyclonic separator as opposed to the filter unit. The cyclonic separator was fixed to the planter behind (referring to the direction of travel of the planter in use) the turbine and between seed hoppers.

All of the exhaust air from the cyclonic separator was channeled to a filter unit via a fixed connection. The filter unit was the form of a metal housing fitted with a fine dust pocket filter (0.5 micron particle size, 820 $m^3$/hour maximum air flow, 2.1 $m^2$ active filter surface area, UNIFIL AG, Switzerland). The filter unit was fixed to the cyclonic separator as a single apparatus.

In order to simulate the most demanding conditions one would expect in use, the trial was conducted under extremely dry soil conditions. Considerable dust was generated by the tractor and planting equipment putting maximum stress on the particle removing apparatus. A total of 6 Ha were planted and at the end of the trial the particles collected in the cyclonic separator and filter unit were weighed. Results are shown in Table 2.

TABLE 2

| | Collected Particles (g) | | Collected Particles (g/Ha) | |
|---|---|---|---|---|
| Trial | Cyclonic Separator | Filter Unit | Cyclonic Separator | Filter Unit |
| 3 | 841 | 51 | 140.2 | 8.5 |

The observation in trial 3 that the cyclonic separator gathered 94% of the particulate matter, leaving only 6% to be caught in the filter, confirmed expectations that increasing the length:width ratio of the cyclonic separator would result in an increased amount of particles captured in this phase of the particulate removal process.

This trial provides guidance to a skilled person on how to configure the relative sizes and capacities of the cyclonic separator and filter unit so that the desired outcome is achieved. For example, when one expects some measure of viable seeds which are merely too small to be effectively drilled with the available drilling disk, one could provide rather the opposite arrangement from trial 3 so that small seeds and little else would be captured in the cyclonic separator, leaving the remaining, undesired dust and debris ready for disposal in the filter unit.

Example 3: Further Evaluation of a Second Embodiment

Maize seeds were provided in a manner similar to Example 1. The cyclonic separator was provided and operated according to Example 2

A trial was conducted under dry soil conditions. A total of 23 Ha were planted and at the end of the trial the particles collected in the cyclonic separator and filter unit were weighed. Results are shown in Table 3.

TABLE 3

| | Collected Particles (g) | | Collected Particles (g/Ha) | |
|---|---|---|---|---|
| Trial | Cyclonic Separator | Filter Unit | Cyclonic Separator | Filter Unit |
| 4 | 3284 | 158 | 137 | 6.6 |

The observation in trial 4 that the cyclonic separator gathered 95.4% of the particulate matter, and that the remaining 4.6% were caught in the filter, further demonstrated that the combination of cyclonic separator and particulate filter give an effective particulate removal process.

Although the foregoing invention has been described in some detail by way of illustration and example for purposes of clarity of understanding, it will be obvious that certain changes and modifications may be practiced within the scope of the present invention.

The invention claimed is:

1. An agricultural seed planter, comprising:

a planting disk having a hole configured to hold a seed;

a vacuum system, having an air outlet direction and being in fluid communication with the hole of the planting disk, the vacuum system configured to pull the seed to the hole of the planting disk;

a particle removing apparatus, for removing particulate matter from exhaust air exiting the vacuum system, connected downstream of the hole in the planting disk and in the air outlet direction, the particle removing apparatus comprising:

a plurality of cyclonic separators connected in series, each having a first end and a second end, the first end comprising a cyclonic separator air inlet and a cyclonic separator air outlet, and the second end comprising a particle area;

a filter unit;

a first air conduit disposed between the planter air outlet and the cyclonic separator air inlet; and a second air conduit disposed between the cyclonic separator air outlet and the filter unit;

wherein when in use the particle area of a cyclonic separator of the plurality of cyclonic separators comprises a particle passageway between an opening in the second end of the cyclonic separator and an agricultural field; and wherein the plurality of cyclonic separators comprise a first cyclonic separator upstream of a second cyclonic separator;

wherein the first cyclonic separator is configured to capture broken seeds or pellets and the second cyclonic separator is configured to capture fragments of coatings or dust from treated seeds.

2. The agricultural seed planter of claim 1, wherein the particle area defines an opening in the second end of the cyclonic separator.

3. The agricultural seed planter of claim 1, wherein the particle area comprises a removable or openable receptacle.

4. The agricultural seed planter of claim 1, wherein the filter unit comprises a housing and filter disposed in the housing.

5. The agricultural seed planter of claim 1, wherein the filter unit comprises a cleanable or disposable filter.

6. The agricultural seed planter of claim 1, further comprising a prefilter at an air inlet of the vacuum system to prevent aspiration of dust.

7. The agricultural seed planter of claim 1, wherein at least one of the plurality of cyclonic separators is horizontally oriented.

8. The agricultural seed planter of claim 1, wherein at least one of the plurality of cyclonic separators has a baffle chamber design.

9. The agricultural seed planter of claim 1, wherein at least one of the plurality of cyclonic separators is mounted directly to the frame of the agricultural seed planter.

10. The agricultural seed planter of claim 1, wherein the filter unit is part of a continuous device along with at least one of the plurality of cyclonic separators.

11. A method of removing particulate matter from exhaust air exiting an agricultural vacuum planter, comprising:

directing the exhaust air exiting the agricultural vacuum planter to a plurality of cyclonic separators arranged in series, wherein when in use a cyclonic separators, of the plurality of cyclonic separators and having a bottom end for collection, contains a particle area comprising a particle passageway between an opening in the bottom end of the cyclonic separator and an agricultural field; and directing air exhausted from the cyclonic separator to a filter unit.

12. The method of claim 11, wherein the particulate matter is fragments of coatings or dust from treated seeds.

13. The method of claim 11, wherein the largest particulate matter collected from the exhaust is broken seeds or pellets.

* * * * *

UNITED STATES PATENT AND TRADEMARK OFFICE
CERTIFICATE OF CORRECTION

PATENT NO. : 10,420,275 B2
APPLICATION NO. : 15/027326
DATED : September 24, 2019
INVENTOR(S) : Hussherr et al.

It is certified that error appears in the above-identified patent and that said Letters Patent is hereby corrected as shown below:

In the Claims

In Claim 11 (Column 12, Lines 18-20) "wherein when in use a cyclonic separators, of the plurality of cyclonic separators and having a bottom end for collection," should read -- "wherein when in use a cyclonic separator, of the plurality of cyclonic separators each having a bottom end for collection," --

Signed and Sealed this
Eleventh Day of February, 2020

Andrei Iancu
*Director of the United States Patent and Trademark Office*